United States Patent [19]
Abella et al.

[11] 3,938,924
[45] Feb. 17, 1976

[54] THERMOPLASTIC MELT APPARATUS

[75] Inventors: Richard M. Abella, Cranford, N.J.; Keith D. Dodson; Jerry G. Richardson, both of Greenville, S.C.

[73] Assignee: Celanese Corporation, New York, N.Y.

[22] Filed: Mar. 28, 1974

[21] Appl. No.: 455,763

[52] U.S. Cl. ............ 425/147; 425/197; 425/199; 425/198; 425/376; 425/382.2
[51] Int. Cl.² ............................................ B29B 5/02
[58] Field of Search .......... 425/147, 197, 198, 199, 425/DIG. 200, 376, 382.2

[56] References Cited
UNITED STATES PATENTS

| | | | |
|---|---|---|---|
| 2,437,703 | 3/1948 | Moncrieff | 425/199 X |
| 3,012,373 | 12/1961 | Willis | 425/147 UX |
| 3,551,943 | 1/1971 | Staton et al. | 425/197 X |
| 3,715,416 | 2/1973 | Campbell et al. | 425/198 X |

*Primary Examiner*—Robert L. Spicer, Jr.
*Attorney, Agent, or Firm*—Marvin Bressler; Thomas J. Morgan; Linn I. Grim

[57] ABSTRACT

An apparatus for the continuous filtration and flow of molten thermoplastic polymer from a melt source to a shaping apparatus. The apparatus is characterized by the employment of a melt reservoir whose level is regulated by a level control means. Melt flow to the shaping apparatus is regulated by the level control means which controls the flow rate from the melt source as a function of the level in the melt reservoir.

16 Claims, 4 Drawing Figures

THERMOPLASTIC MELT APPARATUS

BACKGROUND OF THE DISCLOSURE

1. Field of the Invention

The instant invention is directed to an apparatus for continuous filtration and flow of molten thermoplastic polymer. More specifically, the instant invention is directed to an apparatus for continuous filtration and flow of molten thermoplastic polymer from a melt source to a shaping apparatus.

2. Background of the Prior Art

The employment of molten thermoplastic polymers in the production of such large usage applications as man-made fibers, polymeric films and the like represents immense volume activity. In most applications the second processing step in this procedure, subsequent to melt formation, but prior to the shaping of the melt into a fiber, film or the like is the filtration of the melt to eliminate foreign particles, and more importantly, to provide a homogeneous melt. A homogeneous melt assures that gels, impurities or other degradation products formed in the polymerization step are removed. Gels, degradation products and the like, as those skilled in the art are aware, result in the formation of inferior grade polymeric shaped articles.

In a typical thermoplastic melt filtration system two filter means are disposed in parallel configuration. The extruded molten polymer is typically directed into one of two lines by means of a three-way valve or the like. Each of the two lines is provided with a replaceable filter means. When the filter life of the filter means is expired due to plugging etc., the valve is turned and flow is directed to the second branch line equipped with a new filter means. While this second filter means is operating, the first filter means is replaced with a fresh filter and this replacement process is repeated as necessary. In this way, the costly process of shutting down the fiber or film forming process to replace filters is eliminated.

Although this procedure results in a process that eliminates complete shutdown, this process of the prior art has inherent disadvantages which results in substantial loss of product and oftentimes shutdown of production.

To understand the disadvantages of the prior art it is necessary to review the apparatus and process that are currently employed in thermoplastic melt processing. In the prior art, an extruder or the like extrudes a stream of molten thermoplastic polymer to a three-way valve. The three-way valve is provided with three positions — a closed position, a position providing flow to a first line provided with a filter means and a third position providing flow to a second line also provided with a filter means. The three-way valve also can be set to intermediate positions, permitting flow to both parallel branch lines. In the normal operation of the prior art process, the three-way valve is set to provide thermoplastic melt flow through one of the two lines. In this prior art process the two branch lines, each provided with a replaceable filter means, come together downstream of the filters, meeting to form an inlet of a four-way valve. The outlet of the four-way valve communicates with a conduit in communication with the inlet of a shaping apparatus such as a spinneret, a die or the like where the melt is formed into a shaped article.

In the operation of the prior art process, a filter is replaced by initially moving the upstream three-way valve a slight amount so that some of the melt flow is diverted to the second line although the predominant melt flow is still directed through the first line, the line containing the filter that must be replaced. This results in the filling of the second line. With the parallel disposed first and second lines full with polymer the prior art process calls for the upstream three-way valve to be moved to a position which provided equal melt flow to the first and second lines. At this point the downstream valve is moved for the first time, so that instead of the first line being in communication with the shaping apparatus, and the second line communicating with a vent, communication is made between the second line and the shaping apparatus while the first lines communicate with the vent. Finally, with the downstream valve moved to provide communication with the second line containing the fresh filter, the upstream three-way valve is turned to provide sole communication between the melt source and the second line.

Although the above-described procedure represents the optimum manipulation of flow regimes for the process and apparatus of the prior art, the step in which the downstream valve is moved to provide communication between the on-coming line, having the new filter, and the shaping apparatus presents serious disruption in the normal operation of the shaping operation, i.e., film formation, fiber forming, etc. During the turning of the downstream valve the valve moves through a position in which all flow of the thermoplastic melt to the shaping apparatus is cut-off. As those skilled in the art are aware, a melt pump which moves thermoplastic melt from a melt source to a shaping apparatus is provided with safety controls which automatically cuts off flow when a critical pressure is reached. The momentary cut-off of melt flow to the shaping apparatus often causes a build-up of pressure in excess of the critical pressure resulting in an automatic shutdown of the pump. This results in a situation analagous to the position that was obtained before the introduction of the prior art process. That is, the apparatus must be completely shutdown and restarted, with a resultant serious loss of product and time, whenever a filter change is made.

Although the above result is most common, oftentimes the pump does not cutout so that no shutdown results. However, even this result causes serious problems in that there is still a discontinuity in the polymeric melt flow. Often this causes the formation of bubbles which usually result in a break in the shaped article upon the imposition of a stretching. A break results in a shutdown of production. Even, if no bubbles are formed, that is, in the best possible case, which is not usual, there is a decrease in the melt mass rate of flow resulting in a thinning of the formed sheet or a decrease in the diameter of the formed filament as the case may be. This causes an off-specification product at best or a tear in the shaped article at worse.

The above prior art operation of the process and apparatus for filtration of a thermoplastic melt between a melt source and a shaping apparatus not only results in serious processing difficulties, but moreover, results in inferior shaped article product. This is postulated to be caused by the frequent shutdown of the system which is postulated to cause residual melt in the lines. This melt, due to complex conditions, polymerizes to form gels and the degradation products. Upon restartup of the system the melt flow entrains these gels, many of which ultimately appear in the shaped article.

This is especially true if the gels form downstream of the filters in the parallel branch lines.

The above description of the present prior art process indicates a need for a new improved apparatus for filtering and moving a thermoplastic melt between a melt source and a shaping apparatus.

SUMMARY OF THE INVENTION

The present invention is directed to an apparatus which overcomes the disadvantages of the process and apparatus of the prior art. This is accomplished by the replacement of the four-way downstream valve of the prior art with a melt reservoir apparatus which permits changeover from one parallel line provided with an exhaused filter to another parallel line provided with a fresh filter without any disruption in flow to the shaping apparatus. This eliminates the serious processing problems of the prior art associated with filter replacement in thermoplastic melt lines. It also results in an improved melt product as manifested by improved shaped article products.

In accordance with the instant invention an assembly is provided for the continuous filtration and transport of a thermoplastic melt from a melt source to a shaping apparatus. The assembly includes a melt source providing a continuous flow of a thermoplastic melt. A diverting means, disposed downstream of the melt source, provides communication between the melt source and at least two parallel conduits. Each of the parallel conduits is provided with a replaceable filter means to filter the thermoplastic melt stream. The assembly furthermore includes a melt reservoir downstream of and in communication with each of said parallel conduits into which the filtered melt flow. A level controlling means controls the output of the melt source to ultimately provide a uniform rate of melt flow downstream to the shaping apparatus. The level controlling means regulates flow in response to the level in the melt reservoir. The melt exits the reservoir by the motive force provided by a positive displacement pumping means. The pumping means is disposed downstream of the melt reservoir to transmit a constant flow to a shaping apparatus, disposed downstream of said reservoir and provided to shape the thermoplastic melt, supplied to it at a constant rate, into a shaped article.

BRIEF DESCRIPTION OF THE DRAWINGS

The instant invention may be better understood by reference to the accompanying drawings of which.

DETAILED DESCRIPTION

Figure 1:
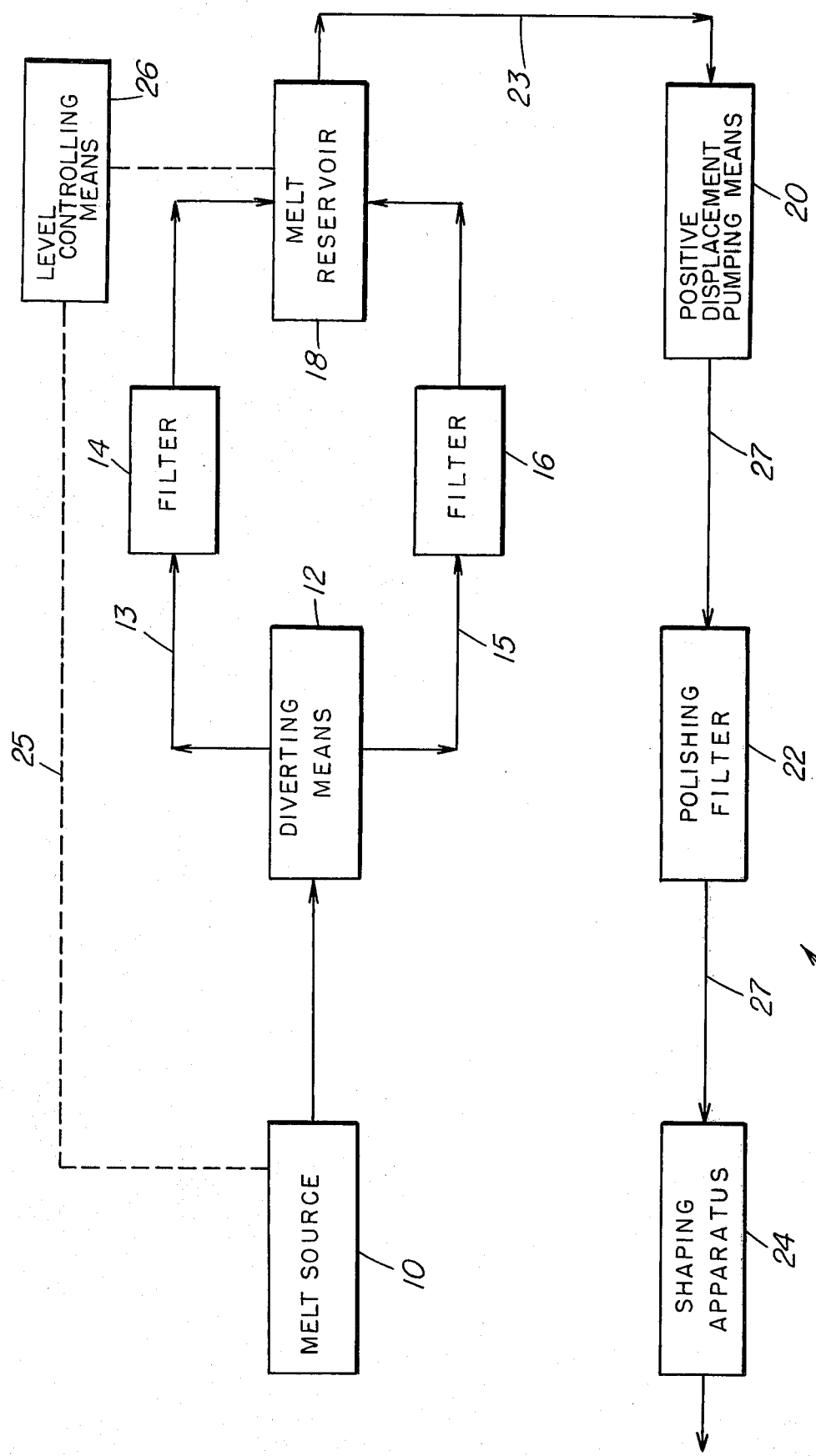
FIG. 1 is a schematic flow diagram of the process of the instant invention.

Referring now to the drawings in detail, the process and apparatus of the instant invention is directed to a thermoplastic polymeric melt processing apparatus for transporting and filtering a thermoplastic melt from a melt source to a shaping apparatus. The apparatus assembly is generally indicated at 1 and includes a melt source 10. The melt source 10 is preferably an extruder that emits a stream of thermoplastic melt. In an alternate preferred embodiment the melt source 10 comprises a polymerization vessel in which the product of the reaction is a thermoplastic melt.

The thermoplastic melt exiting the melt source 10 is transmitted by suitable conduit means to a diverting means 12 disposed downstream thereof. The diverting means 12 provides communication for the melt stream from the source 10 to at least two parallel branch lines. The diverting means 12 in the preferred embodiment is a three-way valve which provides communication between the melt source 10 and either of one or two parallel branch lines in communication with said three-way valve. Alternately, in another preferred embodiment, the diverting means 12 comprises a pump disposed at the upstream end of each parallel branch line. The operation or non-operation of these pumps supplies or stops flow respectively to that branch. In still another preferred embodiment of this invention, each branch line is provided with a valve at the upstream end thereof. The opening or closing of this valve once again regulates flow to that branch line.

In the preferred embodiment illustrated in FIG. 1, two parallel branch lines, designated by reference numerals 13 and 15 are shown. Each parallel branch is provided with a removable filter. The filters, disposed downstream of the pump or valves if either of these preferred embodiments of a diverting means 12 are employed (not shown in FIG. 1), are in a preferred embodiment, fine porosity sintered metal filters. Two such filters 14 and 16 are provided in the filtering assembly 1, one each in each parallel branch 13 and 15 respectively. In general, one filtering unit is provided in each parallel branch and there are as many filtering units as there are parallel branch lines provided.

The parallel branch lines all come together at the inlet of a melt reservoir. In illustrated assembly 1, the two parallel branches 13 and 15 merge into melt reservoir 18. The melt reservoir 18 is more particularly depicted in FIG. 2. It comprises, in a preferred embodiment, a closed vessel provided with a plurality of inlet standpipes, equal in number to the number of parallel lines feeding into it. In assembly 1 there are two standpipes 17 and 19 in communication with conduit lines 13 and 15 respectively. It should be emphasized that the melt flowing into the reservoir 18 enters at the approximate melt level 21. This is significant in that the outlet conduit 23 is disposed at the bottom of the reservoir 18. Thus, extended holding time of the melt 21 in the vessel is prevented. This system insures a first in, first out flow regime. By this arrangement cooling or further polymerization of the melt with the resultant formation of solids or gels is minimized.

Figure 2:
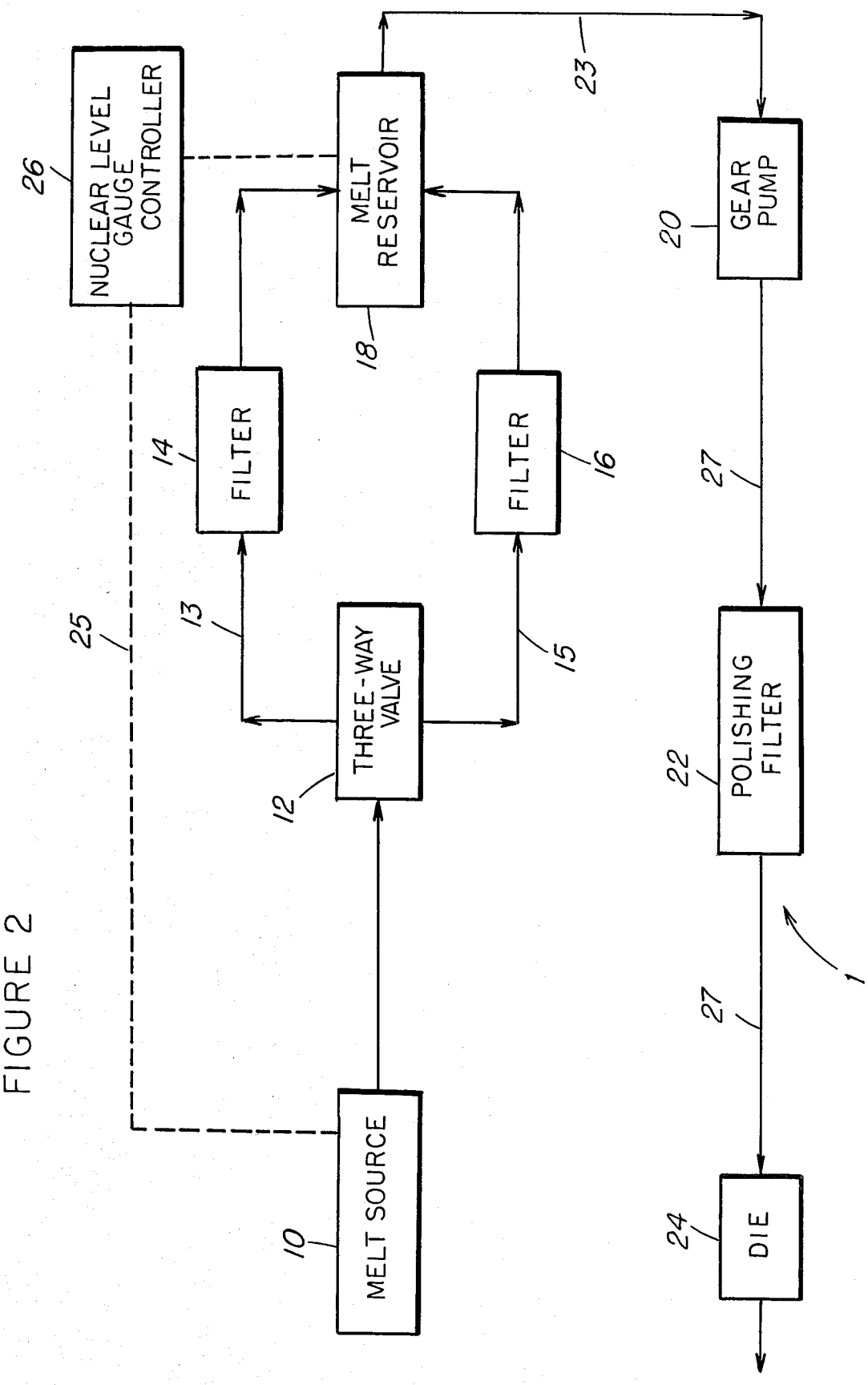
FIG. 2 is another schematic flow diagram of the process of the instant invention.
Figure 3:
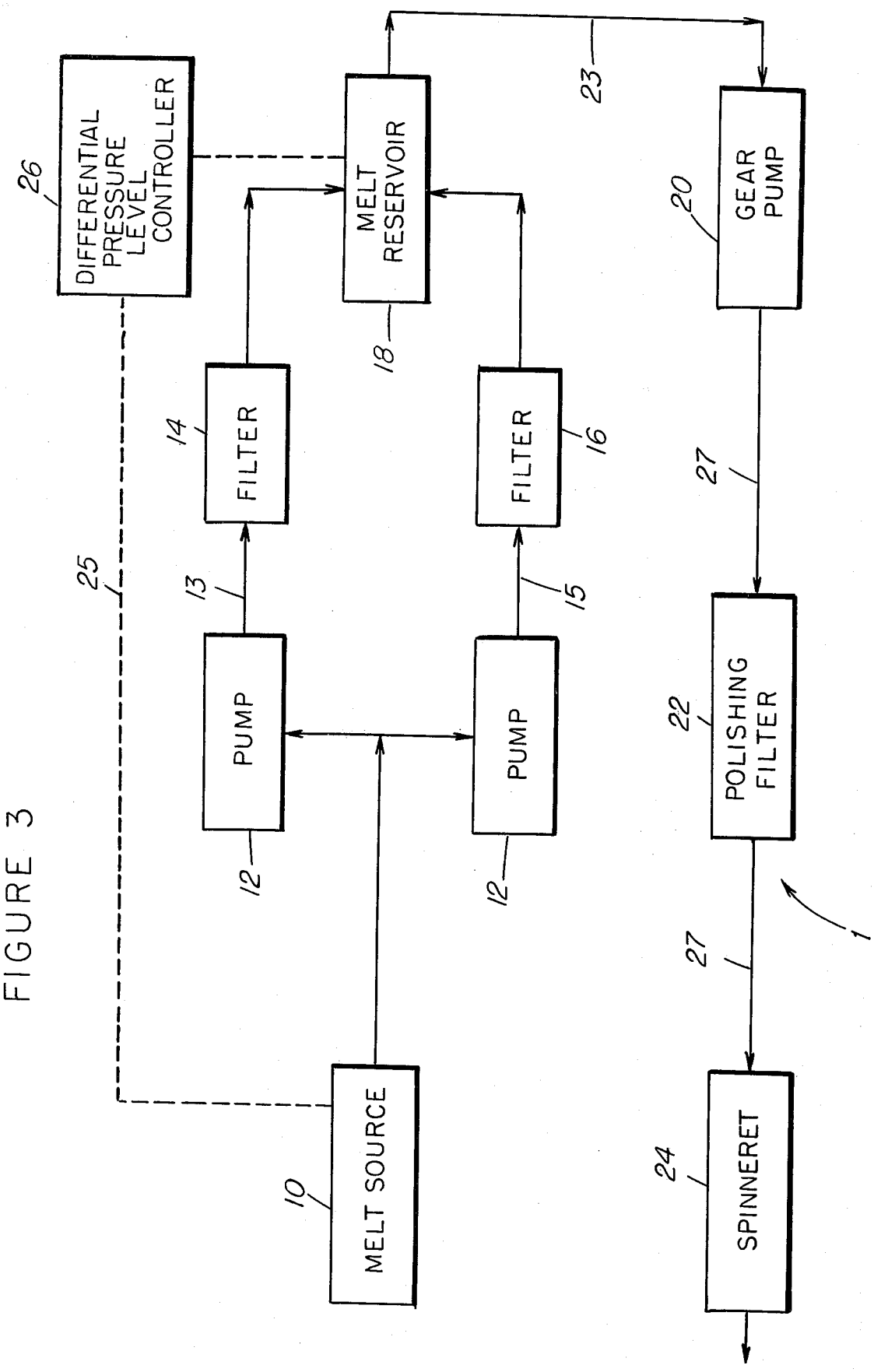
FIG. 3 is still another schematic flow diagram of the process of the instant invention.
Figure 4:
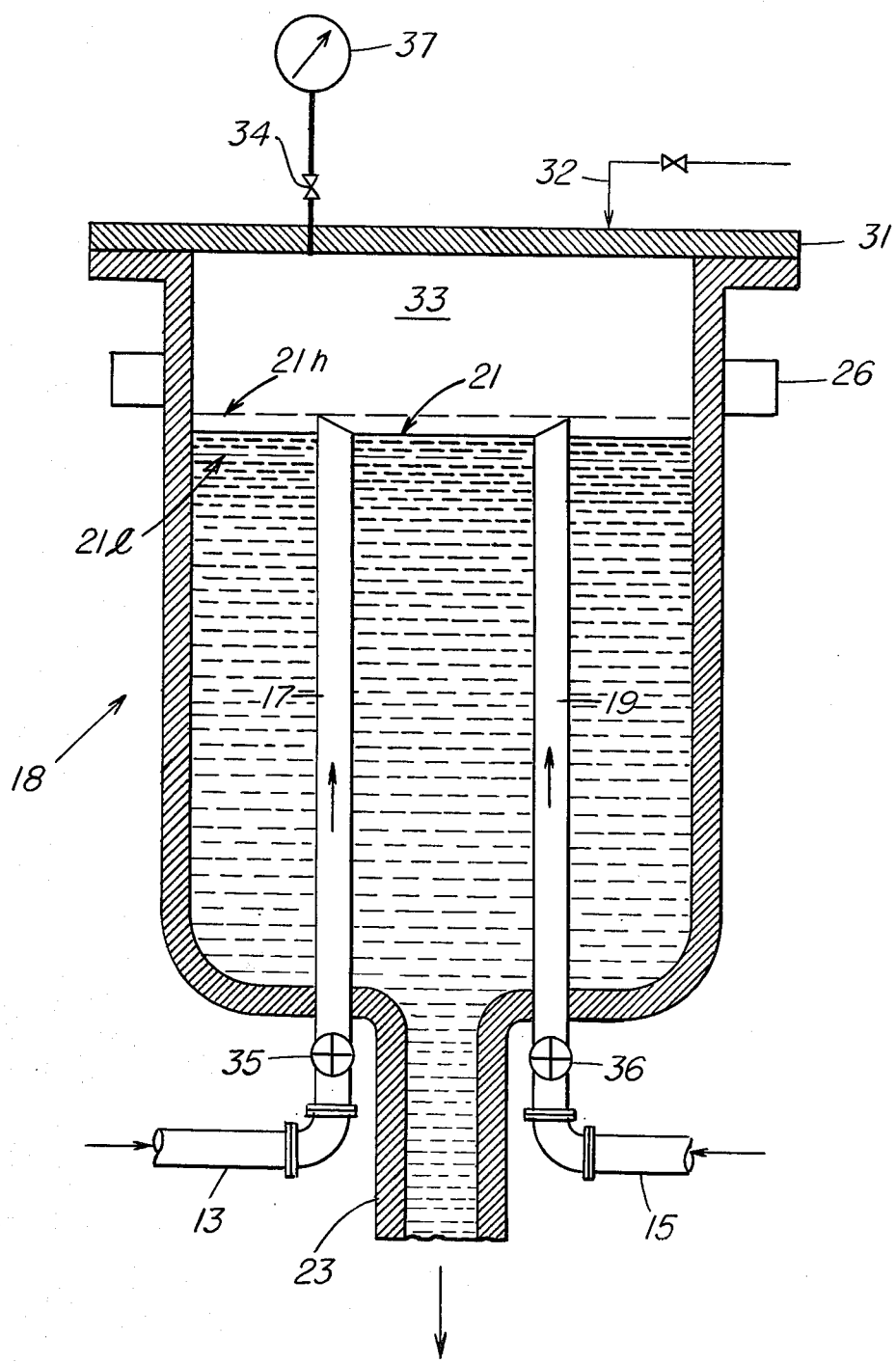
FIG. 4 is a schematic representation of the melt reservoir and melt pump of the instant invention.

Another important design characteristic of the melt reservoir 18 incorporated to prevent the formation of gels and other degradation products is the employment of an inert atmosphere in the reservoir. As those skilled in the art are aware, many thermoplastic melts are subject to oxidative degradation in the presence of a reactive gas such as the oxygen present in air. To overcome this problem the reservoir is closed with a suitable sealed cover 31. A source of an inert gas is provided through conduit 32 to provide an inert gas blanket 33 over the melt level in the reservoir 18. A pressure control means 34 comprising, in a preferred embodiment, a pressure relief valve is provided to maintain a fixed pressure in the reservoir. As shown in FIG. 2 the control means 34 may include pressure indicating means, i.e., a pressure gauge 37.

An additional feature necessary to retain a closed vessel free of oxidizing air is a plurality of sealing means, one of said sealing means disposed in each of the standpipes. The sealing means, in one preferred embodiment a ball valve, is located outside the vessel. Obviously, an open line would permit the inert gas to bleed out of the melt reservoir. In the embodiment illustrated in FIG. 2 two valves 35 and 36 are shown disposed in inlet standpipes 17 and 19 respectively.

It should be appreciated that inlet means provided in the melt reservoir by the illustrated standpipes 17 and 19 may be as effectively provided by another preferred embodiment. That is, a plurality of side inlets, each inlet in communication with a parallel branch line, may be employed. In that case the side branch inlets are located at about the melt level height in the reservoir.

The assembly 1 is provided with a level controlling means 26 in communication with the melt reservoir. The level controlling means 26 senses the level in the melt reservoir 18 and sends a signal in proportion to the level in the reservoir. Thus, a signal is generated to increase the melt flow to the reservoir 18 in the event that the level 21 is below the pre-set level. Also a signal to decrease the melt flow to the melt reservoir 18 is generated when the melt level 21 is above the pre-set level.

In a preferred embodiment the level controlling means 26 is a nuclear level gauge controller. Another controlling means that may be employed is a differential pressure level controller.

The signal generated by the level control means 26 is, in a preferred embodiment, in electrical communication with the melt source 10. Thus, a signal to increase the level in the melt reservoir 18 may activate an extruder to increase its speed so as to increase the melt flow. Similarly, the melt output from a continuous polymerizer may be increased as a result of the signal transmitted by the level controller. The opposite result may also be effected in a signal from the controller indicating too high a level in the melt reservoir.

The assembly 1 further includes a positive displacement pumping means 20 disposed downstream and in communication with the melt reservoir 18 through outlet conduit 23. As those skilled in the art are aware, a positive displacement pump provides a constant output. Thus, a constant rate of thermoplastic melt is pumped downstream from the melt reservoir 18 by the pumping means 20.

The melt is conveyed downstream by way of conduit 27 toward the shaping apparatus. In a preferred embodiment illustrated in the drawings a polishing filter 22 may be disposed in the line connecting the melt pumping means 20 and the shaping apparatus. This filter has as its purpose the removal of large gels and degradation products that may form downstream of the primary filters 14 and 16. The polishing filter 22 is preferably the same type of filter as the primary filter 14 and 16, that is, a sintered metal filter. However, the polishing filter is coarser and preferably filters out impurities in the range of above 30 microns or larger. It should be noted that the fine size primary filters 14 and 16 preferably filter out smaller size particles in the range of about 10 to 15 microns or larger.

The preferably refiltered melt is thereafter conducted, by means of conduit 27, to a shaping apparatus 24. The shaping apparatus is a generic term for an apparatus that shapes the thermoplastic melt into the shape of the desired solidified shaped article. The shaping apparatus 24 is a die, in the event that the shaped article is a film. In a second preferred embodiment, the shaping apparatus 24 is a spinneret when the shaped article to be produced is a filament. Other shaping devices may also be used when other types of shaped articles are to be produced.

In operation, a thermoplastic melt, provided at the melt source 10, is conveyed through a suitable conduit to the diverting means 12. The diverting means 12 provides communication, during normal production, with one of at least two parallel branch lines. Each of the branch lines, such as those depicted at 13 and 15, is equipped with a removable and replaceable primary filter such as those illustrated at 14 and 16, that preferably filters out gels, degradation products and foreign particles having a size equal to or more than 10 to 15 microns. It is noted that while melt flows through one of the branches, the other branches, having exhausted filters, are replaced without the necessity of any downtime.

The filtered melt is conveyed from the parallel branch line, for example 13 or 15, to the melt reservoir 18 by a standpipe, such as that illustrated at 17 or 19, which communicates with the downstream end of the branch line 13 or 15 respectively. The standpipe, 17 or 19, extends to about the melt level 21 so that the melt in the reservoir 18 leaves the reservoir prior to the incoming melt emitting from the standpipe.

The level in the melt reservoir 18 is maintained constant by a level controlling means 26. The level controlling means senses the melt level 21 continuously. If the level is low, say the level is at 21 $l$, the level controlling means 26 sends a signal which activates the melt source 10 to provide additional melt to bring the melt level back up to 21. Similarly, the melt rate of flow from the melt source is diminished in the event the melt level rises to say 21 $h$. For example, a nuclear gauge may be stationed around the reservoir 18 to continuously measure the melt level 21 and thus control the melt source output.

In order to prevent oxidation and degradation of the melt in the melt reservoir 18 the space above the melt level 21 is filled with a pressurized inert gas. It is preferred that the inert gas be nitrogen mainly because of its low price. Of course, any other inert gas may also be employed without any decrease in effectiveness.

In order to further insure against degradation a sealed cover 31 is provided at the top of the reservoir 18. As a safety precaution a pressure relief valve 34 and gauge 37 are provided to insure against overpressurization. A gas supply conduit 32 is provided to maintain the pressurized inert atmosphere.

In order to maintain the inert pressurized atmosphere the valves disposed at the upstream end of the standpipes outside the reservoir 18 are all closed save the valve in the operating standpipe, that is, the standpipe in which the melt is flowing. Thus, in the diagrammed embodiment, when melt enters the reservoir through standpipe 17 valve 35 is opened and valve 36 is closed.

The melt exits the reservoir 18 through outlet 23 by means of a positive displacement pumping means 20, the inlet of which communicates with the outlet end of conduit 23. As those skilled in the art are aware the positive displacement pumping means 23 provides a constant output. Thus, by maintaining a constant head, by means of a constant level in the melt reservoir 18, the supply to the pumping means 20, which in a preferred embodiment is a gear pump is constant. There is no buildup in pressure and the assembly operates without interruption. Obviously, the rate of production can be increased or decreased by changing the speed of the pumping means 20. This obviously causes an increased or decreased melt rate to the shaping apparatus 24. In addition, the decreased or increased, respectively, level in the reservoir 18 caused thereby is immediately sensed by the level controlling means 26 which signals the melt source 10 to increase or decrease the melt output to restore the nominal level in the melt reservoir 18.

The melt continues downstream through the discharge end of the pumping means 20 through conduit 27 to a shaping apparatus 24 where it issues forth as a molten shaped article. In a preferred embodiment, it is preferred to provide a secondary filter 22 to remove gels or other degradation products that may form downstream of the primary filter, i.e., filters 14 or 16.

To better appreciate the advance in the art provided by the process and apparatus of this invention a description of the operation of the assembly during a filter change is described below. In this operation, melt flow is transferred from a line containing an almost spent filter to another parallel branch line provided with a fresh filter.

Turning again to the drawings, assuming that filter 14 is almost completely spent the operation entails transferring thermoplastic melt flow through line 15 containing new filter 16. The first step is to adjust the diverting means 12, in a preferred embodiment a three-way valve, from its position providing communication between the melt source 10 and the branch conduit 13 to a position in which a small fraction of the flow is diverted to branch line 15. This position of the diverting means 12 is maintained until the line 15 is completely filled with polymeric melt. It should be appreciated that this operation may be provided by means of separate pumps or valves provided in each parallel branch if these other preferred embodiments are utilized. At this instant there is a momentary decrease in flow rate to the reservoir 18 since melt is employed to fill the previously open line, in this case conduit 15. However, unlike the prior art process and apparatus where this momentary decrease in flow caused by the decreased output from conduit 13 has a serious adverse effect, in this invention this results in a slight decrease of the melt level of reservoir 18 which is immediately sensed by the level controlling means 26. The controlling means 26 immediately signals the melt source 10 to increase the melt output to immediately bring back the melt level in reservoir 18 from say 21 $l$ to 21 without any interruption in the output from the gear pump 20.

Returning now to the changeover sequence, upon filling of parallel conduit 15, the diverting means 12 is adjusted to provide equal flow to both the previously employed and the soon to be used branches, in this case branches 13 and 15 respectively. This occurs at an increased melt output rate, which is required to bring back the level in the reservoir to its original height 21. It should be noted that in addition to the melt volume that is required to fill line 15, additional volume of melt must be made up for the amount that remains in the spent filter 14 and in the line 13. Of course, after this melt volume is made up by the increased melt output from the melt source 10, the melt output is automatically readjusted to its previous flow rate. As stated above this occurs when the melt level in the reservoir 18 rises to its previous height. With the pump 20 running at its usual output rate the diverting means 12 is again adjusted to provide complete melt flow to parallel branch line 15, thus completing the transfer of melt flow from the spent filter line 13.

The following examples are provided to illustrate the process and apparatus of this invention.

EXAMPLE 1

A series of runs were made in the production of polyethylene terephthalate film. Polyethylene terephthalate film production is illustrative of the processing of a thermoplastic melt from a melt source, here an extruder, to a shaping apparatus in this case a die to produce a shaped article, a thermoplastic film.

In one set of runs a series of 700 master rolls of polyethylene terephthalate film were produced by the prior art process. This process included the use of a four-way valve in communication with the downstream end of two parallel conduits, each provided with a replaceable filter. Each of the master rolls was inspected to determine the gel level.

The gel level is defined as the number of gels, foreign particles or degradation products having a large enough size to make the film containing said gel level unacceptable as a computer tape substrate. Obviously, a 0 gel level is the optimum desirable product. However, in polyethylene terephthalate film having a minimum number of gels per unit area is acceptable for computer tape usage. As those skilled in the art are aware, a polyethylene terephthalate film used as a computer tape substrate has one of the most severe quality specifications, that is, a very low acceptable gel level of any polyethylene terephthalate film application.

The 700 master rolls were inspected and the results were tabulated to indicate the gel level of each of the master rolls produced. The two most significant results indicate that approximately 25 percent of the master rolls had a 0 gel level and about 62 percent of the master rolls passed the most stingent quality test for computer tape usage.

The test was repeated with a sample of 250 master rolls produced in accordance with the process and apparatus of the instant invention. In this test polyethylene terephthalate film was produced in accordance with the process and apparatus depicted in FIGS. 1 and 2. Thus, in this test the melt reservoir, and level controlling means, controlling melt source output, were employed. Again the results of the inspection of these 250 master rolls were tabulated. The most noteworthy results again are the percentage of the rolls in which a 0 gel level was observed, and the percentage of rolls in which a passible rate for computer tape application was attained. In this case about 63 percent of the rolls exhibited a zero gel level while approximately 92 percent of the 250 rolls had a gel level within acceptable limits for computer tape usage.

These results are totally unexpected in view of the standard view that holds that molten polymer, even under the greatest precautions, results in partial degradation of the polymer with inevitable increase in gel level. Not only does this conventional theory not apply but the result is opposite, unexpectedly much improved over the prior art.

EXAMPLE 2

During the production of polyethylene terephthalate film over a period of several weeks, employing the prior art method and apparatus, a record was kept of the average downtime, that is, the average period of time that film production had to be completely stopped, for a filter change. This average value included those cases in which no downtime was necessary. It was found that every filter change required a complete downtime of about 2 hours. The same test was repeated during the production of several hundred master rolls employing the process and apparatus of this invention. During this period there was no appreciable downtime for a filter change.

EXAMPLE 3

During the production of the polyethylene terephthalate film made in accordance with the process and apparatus of the prior art, described in Examples 1 and 2, as well as in accordance with the instant invention, also described in Examples 1 and 2, records were kept of the time required after a filter change to get back to quality production. That is, the time required for film production to return to a gel level at least as low as that required for use in the most rigorous quality specification, that is, computer tape usage was recorded. It was found that the time period, employing the process and apparatus of the instant invention, was one half the time required in the process and apparatus of the prior art.

The description of the preferred embodiments and examples given above are meant to be illustrative of the scope and spirit of the instant invention. These preferred embodiments and examples will make apparent other embodiments and examples within the scope and spirit of the invention described herein. These other embodiments and examples, made apparent by this description, within the scope and spirit of this invention, are within the contemplation of this invention. Therefore, the invention should only be limited by the appended claims.

What is claimed is:

1. An assembly for the continuous filtration and transport of a thermoplastic melt from a melt source to a shaping apparatus comprising:
    a melt source providing a continuous flow of a thermoplastic melt;
    a diverting means disposed downstream of said melt source providing communication for said melt between said melt source and at least two parallel disposed conduits;
    at least two parallel disposed conduits, each provided with a removeable filter means, wherein said thermoplastic melt stream is filtered;
    a melt reservoir in communication with the downstream end of each of said parallel conduits, said reservoir providing a pool for storage of a fixed volume of said filtered thermoplastic melt;
    a level controlling means, in control communication with said melt reservoir and said melt source said level controlling means regulating the melt output of said melt source as a function of the level in said melt reservoir to insure a uniform melt flow to said melt reservoir;
    a positive displacement pumping means in communication with the outlet of said reservoir, said pumping means providing the motive force to provide a uniform rate of flow of said melt to a shaping apparatus; and
    said shaping apparatus in communication with the discharge out of said positive displacement pumping means, for shaping said thermoplastic melt, which flows into said shaping apparatus at a uniform rate, into a shaped article.

2. An assembly in accordance with claim 1 including a polishing filter disposed in the conduit providing communication between said positive displacement pumping means and said shaping apparatus, said polishing filter provided for the removal of impurities formed downstream of said filters disposed in said parallel conduits.

3. An assembly in accordance with claim 1 wherein said melt source is a polymerization reactor.

4. An assembly in accordance with claim 1 wherein said melt source is a melt extruder.

5. An assembly in accordance with claim 1 wherein said diverting means is a three-way valve.

6. An assembly in accordance with claim 1 wherein said removable filter means, disposed on said parallel conduits, comprises fine porosity sintered metal filters.

7. An assembly in accordance with claim 6 wherein said fine porosity sintered metal filters remove from said thermoplastic melt gels, degradation products and foreign particles having a size in excess of 10 to 15 microns.

8. An assembly in accordance with claim 1 wherein each of said parallel conduits discharge said melt into said melt reservoir at a height in said reservoir equivalent to the melt level in said reservoir.

9. An assembly in accordance with claim 8 wherein said melt reservoir is provided with a plurality of standpipes, equal in number to the number of parallel conduits feeding into said melt reservoir, each one of said standpipes connected to one of said parallel conduits, said standpipes having an outlet for flow of said thermoplastic melt at approximately the melt level in said reservoir.

10. An assembly in accordance with claim 1 wherein said melt reservoir is a closed vessel provided with an inert gas atmosphere in the space above the melt level.

11. An assembly in accordance with claim 1 wherein said level controlling means comprises a differential pressure level controller.

12. An assembly in accordance with claim 1 wherein said level controlling means comprises a nuclear level gauge controller.

13. An assembly in accordance with claim 1 wherein said positive displacement pumping means comprises a gear pump.

14. An assembly in accordance with claim 1 wherein said shaping apparatus comprises a die.

15. An assembly in accordance with claim 1 wherein said shaping apparatus comprises a spinneret.

16. An assembly in accordance with claim 1 wherein said diverting means is a pump disposed at the upstream end of each of said parallel disposed conduits.

* * * * *